United States Patent
Waynick, Sr. et al.

(10) Patent No.: US 9,843,170 B2
(45) Date of Patent: Dec. 12, 2017

(54) FRAME ASSEMBLY FOR A FRONT MOUNTED PRIMARY BUS CONNECTOR AND METHOD OF CONSTRUCTION

(71) Applicant: SCHNEIDER ELECTRIC USA, INC., Schaumburg, IL (US)

(72) Inventors: Rodger D. Waynick, Sr., Murfreesboro, TN (US); Matthew A. Williford, Nashville, TN (US); Eldridge R. Byron, Murfreesboro, TN (US)

(73) Assignee: SCHNEIDER ELECTRIC USA, INC., Andover, MA (US)

( * ) Notice: Subject to any disclaimer, the term of this patent is extended or adjusted under 35 U.S.C. 154(b) by 0 days.

(21) Appl. No.: 14/963,675

(22) Filed: Dec. 9, 2015

(65) Prior Publication Data
US 2017/0170638 A1    Jun. 15, 2017

(51) Int. Cl.
| | |
|---|---|
| *H02B 1/21* | (2006.01) |
| *H02B 1/56* | (2006.01) |
| *H02B 1/20* | (2006.01) |
| *H02B 11/173* | (2006.01) |
| *H01H 71/02* | (2006.01) |
| *H01H 69/00* | (2006.01) |

(52) U.S. Cl.
CPC ............... *H02B 1/21* (2013.01); *H01H 69/00* (2013.01); *H01H 71/0207* (2013.01); *H02B 1/20* (2013.01); *H02B 1/56* (2013.01); *H02B 11/173* (2013.01)

(58) Field of Classification Search
CPC . H02B 1/21; H02B 1/56; H02B 1/056; H02B 1/20; H02B 1/205; H02B 11/173; H01H 71/08; H01H 2009/523; H01H 2085/0555; H01H 9/52; H01H 69/00; H01H 71/0207
See application file for complete search history.

(56) References Cited

U.S. PATENT DOCUMENTS

| | | | | | |
|---|---|---|---|---|---|
| 4,230,390 | A | * | 10/1980 | Wells | H01R 13/623 285/353 |
| 5,999,402 | A | * | 12/1999 | Jeffries | G06F 1/20 165/80.3 |
| 6,379,183 | B1 | * | 4/2002 | Ayres | H01R 9/0515 439/578 |
| 6,402,549 | B1 | * | 6/2002 | Ayres | H01R 9/0515 439/578 |

(Continued)

*Primary Examiner* — Adam B Dravininkas
(74) *Attorney, Agent, or Firm* — Locke Lord LLP (57) ABSTRACT

A front-accessible bus-connection mounting frame assembly in a draw out switchgear cabinet is fastened to the back wall of the breaker cabinet. The frame assembly provides for insertion and bayonet mounting of a primary bus connector's cylindrical conductor onto the mounting frame. The primary bus connector is bayonet mounted on the internal ribs of a central cylinder of the mounting frame assembly. The primary bus connector is then fixed in position by bolts front mounted down the central cylinder and out through a bus riser fitted at the back of the mounting frame assembly to establish electrical continuity. The central cylinder further provides a current transformer bushing tube around the primary bus connector and necessary flanges to mount the mounting frame assembly to the back wall and secure the current transformers around the bushing.

6 Claims, 7 Drawing Sheets

(56) References Cited

U.S. PATENT DOCUMENTS

| | | | |
|---|---|---|---|
| 7,450,368 B2 * | 11/2008 | Parker | H02B 1/20 361/600 |
| 8,197,289 B1 * | 6/2012 | Faber | H01R 13/15 439/819 |
| 8,451,589 B2 * | 5/2013 | Milovac | H02B 11/26 361/611 |
| 8,482,903 B2 * | 7/2013 | Milovac | H02B 11/00 361/605 |
| 9,270,093 B2 * | 2/2016 | Kutalek | H01B 17/583 |
| 2005/0239311 A1 * | 10/2005 | Yokoigawa | H01R 13/625 439/311 |
| 2011/0147173 A1 * | 6/2011 | Lee | H02B 11/127 200/50.25 |
| 2012/0055765 A1 * | 3/2012 | Zylstra | H02B 11/127 200/50.24 |
| 2013/0221948 A1 * | 8/2013 | Furlano | G01R 19/00 324/156 |

* cited by examiner

FRAME ASSEMBLY FOR A FRONT MOUNTED PRIMARY BUS CONNECTOR AND METHOD OF CONSTRUCTION

FIELD OF THE INVENTION

The present invention relates to apparatus and methods for constructing a bus conductor-to-primary bus connector for a draw out circuit breaker chassis cabinet which is able to be tightened from the front side of a switchgear cabinet.

BACKGROUND OF THE INVENTION

Large voltages generate high electromotive forces and heat which can loosen the bolted connections in a draw out circuit breaker section of a Switchgear Cabinet. Thus, the bolted connections may need to undergo periodic maintenance to properly torque the bolted connections. Re-torque of fasteners may be required if a thermal imaging, constant thermal monitoring, or performance issues indicate that a joint has loosened. Proper torque is required on bus connections to prevent an increase in resistance which in turn creates an increase in temperature and can lead to thermal runaway.

With increased demands for smaller footprint and utilization of less space, as generally discussed in U.S. Pat. No. 7,450,368 to Parker et al., the switchgear cabinets may need to be placed where access to the rear portion of the breaker section from the back panels of the switchgear cabinet is difficult. Hence there is a need to make the bolted connections of the fixed bus riser to the breaker connection easily accessible from the front section of the cabinet and have the bolted connections be assembled and maintained in a simple fashion.

SUMMARY

In one aspect, the present invention presents a current transformer bushing and primary bus connector assembly and methods of construction providing front access to mounting hardware for the riser and feeder bus. It permits in-service and re-torque of the hardware from the front of the switchgear. The bushing allows the primary bus connector to be held in place without any hardware during construction.

In one aspect of the present invention the primary bus connector is assembled by inserting it into a specially constructed cylinder of a current transformer bushing and then twisting it to engage its locking fins on internal ribs of the cylinder. Then hardware is fastened from the front of the switchgear into nut inserts that are pre-assembled into the riser or feeder bus.

In one aspect of the present invention there is presented a frame assembly for a current transformer bushing and front mounted primary bus connector in a circuit breaker cabinet having a front and a back, comprising: a frame plate with a backwall flange for fastening the frame to a back wall of a circuit breaker cabinet; a central cylinder extending perpendicularly through the frame and with internal ribs in the bore of the cylinder, the radial space between the ribs defining a lesser bore for closely accepting a primary bus connector, with circumferential spaces between the ribs defining fastening chambers for admitting threaded fasteners into the bore; the primary bus connector having a conductor rod portion and a base portion; wherein the conductor rod portion of the primary bus connector is sized to fit in the lesser bore, and the conductor rod portion has locking fins extending radially from a forward section thereof, and the base portion extends perpendicularly therefrom and has throughholes therein sized for the threaded fasteners; the locking fins being sized to fit through the fastening chambers; and extending partially beyond the ribs when the conductor rod portion is fully inserted into the central cylinder thereby defining a type of bayonet mount with the locking fins abutting ends of the ribs and holding the conductor rod portion in place in the central cylinder and positioning the through holes of the base portion in line with the fastening chambers; whereby a bus conductor, such as a power bus riser, having a pattern of holes matching a pattern of holes in the base portion, can be placed over the base portion and connected thereto by the use of threaded fasteners through the base portion and the bus conductor; with the outside diameter of the central cylinder being sized to accept the central opening of a current transformer and function as a current transformer bushing.

In another aspect of the present invention a method of constructing a front-accessible bus-connection in a draw out switchgear cabinet is presented, including the steps of fastening a frame to the circuit breaker section back wall having a front side and back side (also known as inside and outside); pushing a primary bus connector through the circuit breaker section back wall and a first hole in the frame from the back side, rotating the primary bus connector to lock its position in the frame, placing a bus bar in the frame, fastening the primary bus connector and the bus bar to the frame, by placing bolts through the primary bus connector, the frame and the bus bar, from the front side; the primary bus connector and the bus bar being in physical and electrical contact. The method may further include one or more of the steps of: placing current transformers around a bushing tube of the frame and bolting them to the frame from the front side; putting a circuit breaker in contact with the primary bus connector; and removing the circuit breaker from contact and tightening a bolt passing through the frame from the front side.

DETAILED DESCRIPTION

As an initial matter, it will be appreciated that the development of an actual, real commercial application incorporating aspects of the disclosed embodiments will require many implementation specific decisions to achieve the developer's ultimate goal for the commercial embodiment. Such implementation specific decisions may include, and likely are not limited to, compliance with system related, business related, government related and other constraints, which may vary by specific implementation, location and from time to time. While a developer's efforts might be complex and time consuming in an absolute sense, such efforts would nevertheless be a routine undertaking for those of skill in this art having the benefit of this disclosure.

It should also be understood that the embodiments disclosed and taught herein are susceptible to numerous and various modifications and alternative forms. Thus, the use of a singular term, such as, but not limited to, "a" and the like, is not intended as limiting of the number of items. Similarly, any relational terms, such as, but not limited to, "top," "bottom," "left," "right," "upper," "lower," "down," "up," "side," and the like, used in the written description are for clarity in specific reference to the drawings and are not intended to limit the scope of the invention.

Figure 1:
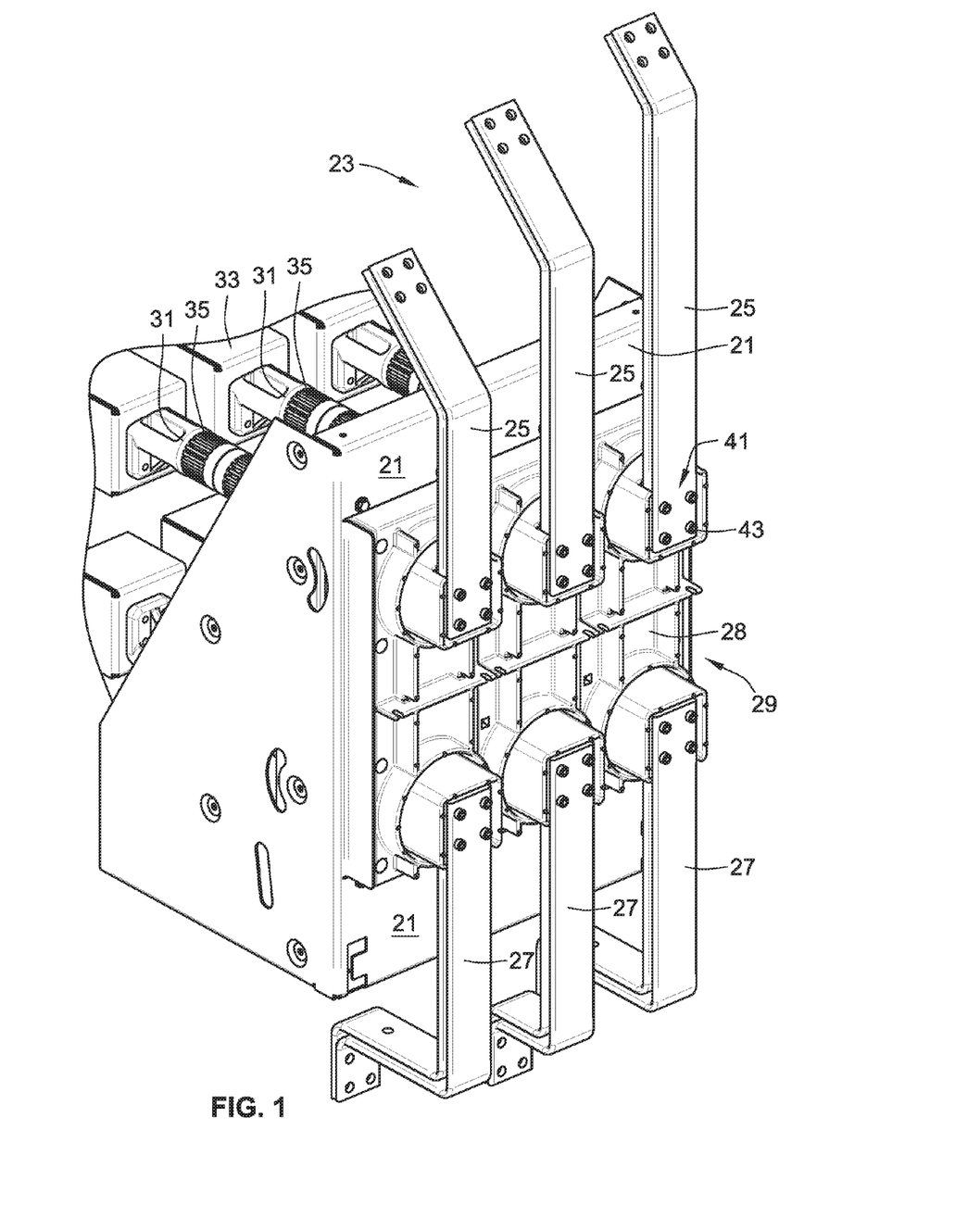
FIG. 1 shows a left side rear perspective of a frame portion of the present invention fastened to the rear wall of a three phase draw out circuit breaker cabinet with the primary load and line busses connected thereto.

By studying the drawings, and with particular reference to FIG. 1, persons of ordinary skill in the art will understand that they are looking at the back wall 21 of a draw out circuit breaker cabinet 23 with three phases of load power bus risers 25 and line power bus risers 27 attached to a frame plate 28 of a frame assembly 29 fastened to the back wall 21. Withdrawable breaker run backs 31 attached to the back of a draw out breaker 33 are visible in the interior of the breaker cabinet 23 and carry finger clusters or tulip connectors 35 for withdrawable power connection of the breaker to the primary load and line power conductors as the breaker is racked in and out of the cabinet. As each phases' power connection through the apparatus of the present invention is substantially the same, only one connection will generally be addressed hereafter for ease of explanation.

Figure 2:
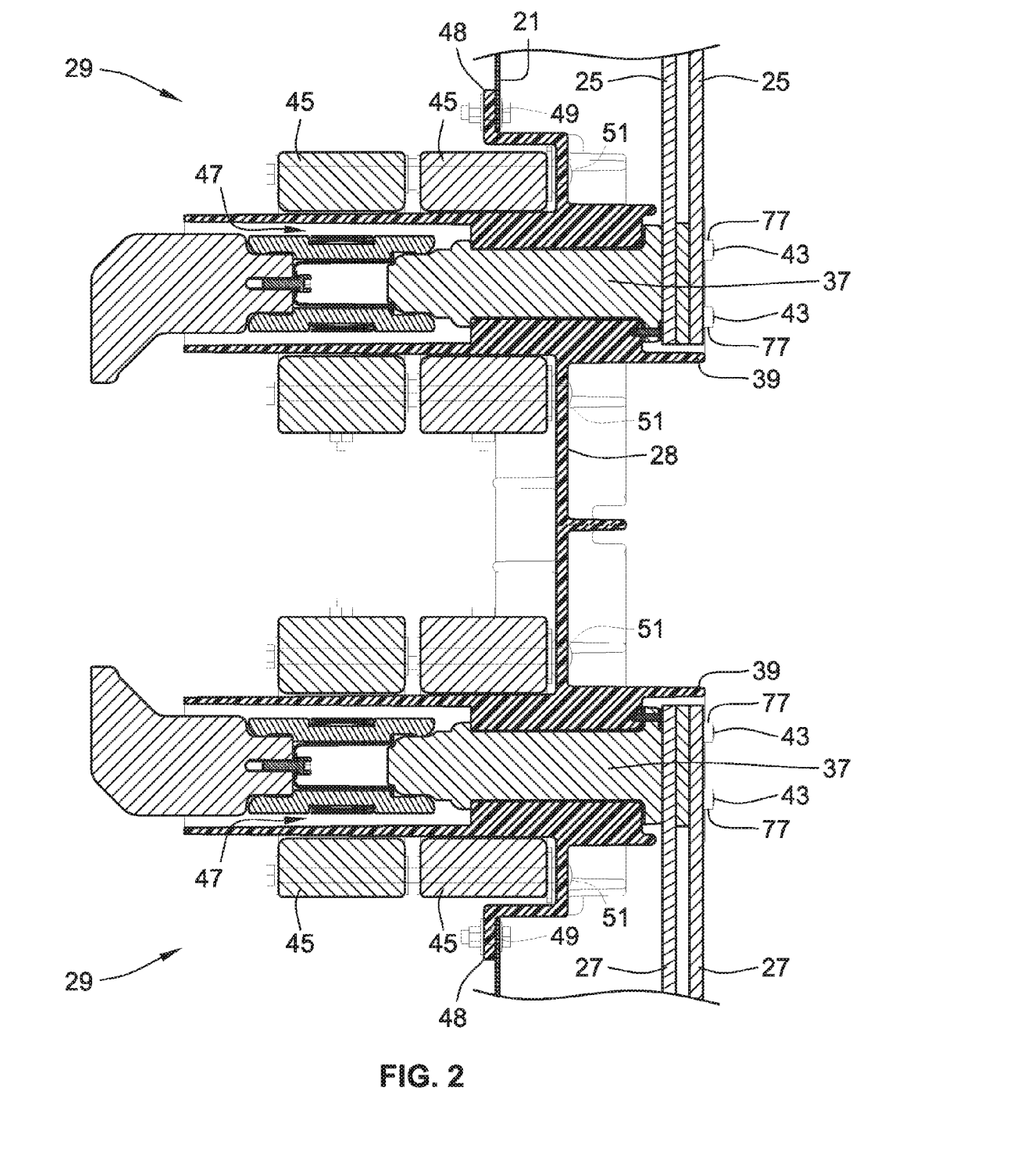
FIG. 2 shows a cross section of the frame assembly through one phase on both sides of the back wall of the circuit breaker cabinet.

Referring also to FIG. 2, each connection will have a frame assembly 29 with a central cylinder 36 for the passage of a primary bus connector 37 therethrough from the backside 39 of the frame plate 28, or from right to left in the drawing. The power bus riser 25 is then placed in a three sided pocket 41 (best seen in FIG. 1) in the backside 39 of the frame over the primary bus connector 37 and fastening bolts 43 are placed through the bus connection 37 and the bus 25 from the forward side of the cabinet 23, i.e. left to right in the drawing, fastening these two conductors together. Current transformers 45 can be mounted over the center cylinder 36 and fastened to the frame assembly 29 in position over the breaker to bus connection in the bore 47 of the central cylinder 36 to monitor the power connection.

Figure 3:
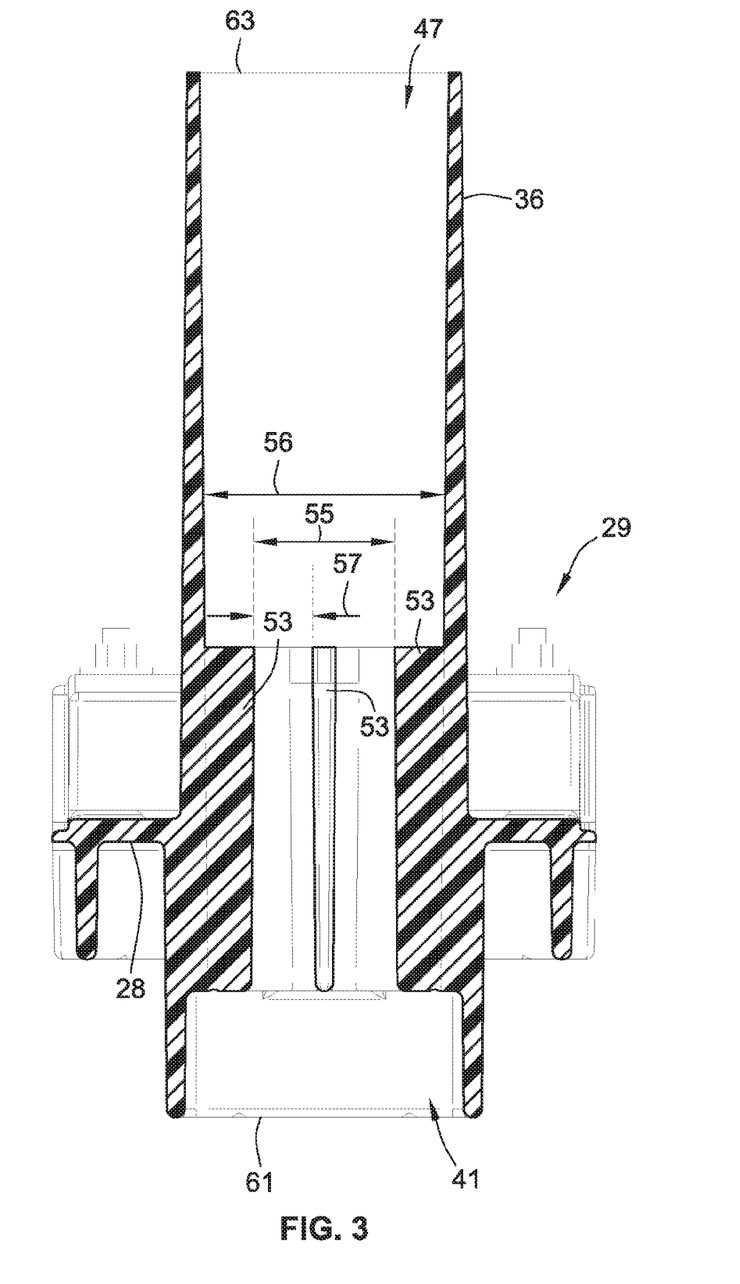
FIG. 3 shows a cross section of the frame assembly without the primary bus connector and busses attached.

Referring also to FIG. 3, the frame assembly 29 is shown by itself in cross section and includes a frame plate 28 including a backwall flange 48 extending from the frame plate 28 and having throughholes 49 for accepting fasteners for fastening the frame assembly 29 to the back wall 21 of a circuit breaker cabinet 23. The frame plate 28 further includes a second set of current transformer-mounting throughholes 51 for accepting bolts which anchor the current transformers 45 in position around the central cylinder 36 as shown in FIG. 2. The central cylinder 36 extends perpendicularly from and through the frame plate 28 from a first end 61 at the three-sided pocket 41 to a second end 63 at the front terminus of the central cylinder 36 and includes internal ribs 53 in the bore 47 of the central cylinder 36. The radial space between the internal ribs, i.e. the diameter between two ribs 180 degrees apart, defines a lesser bore 55 for closely accepting the primary bus connector 37. The greater bore 56 is that internal diameter of the central cylinder 36 without the internal ribs 53. The circumferential spaces between any two ribs 90 degrees apart defines longitudinally extending fastening chambers 57 for accepting locking fins 59 (FIG. 4) on the primary bus connector 37 upon insertion thereof, as further explained below, and for admitting the fastening bolts 43 (FIG. 2) into the bore 47 for fastening the primary bus connector 37 to the power bus riser, e.g. 25, as explained above.

Figure 4:
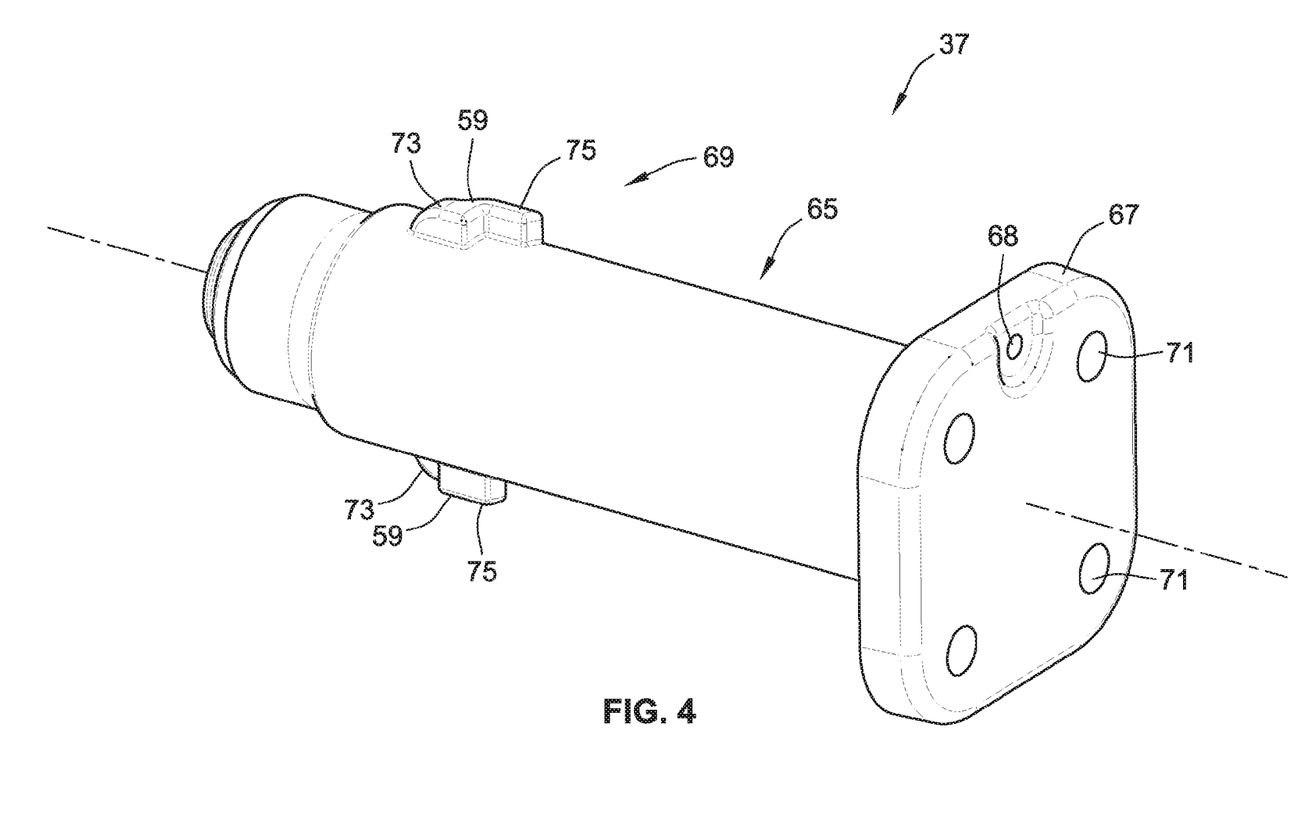
FIG. 4 is a rear perspective view of the primary bus connector.
Figure 5:
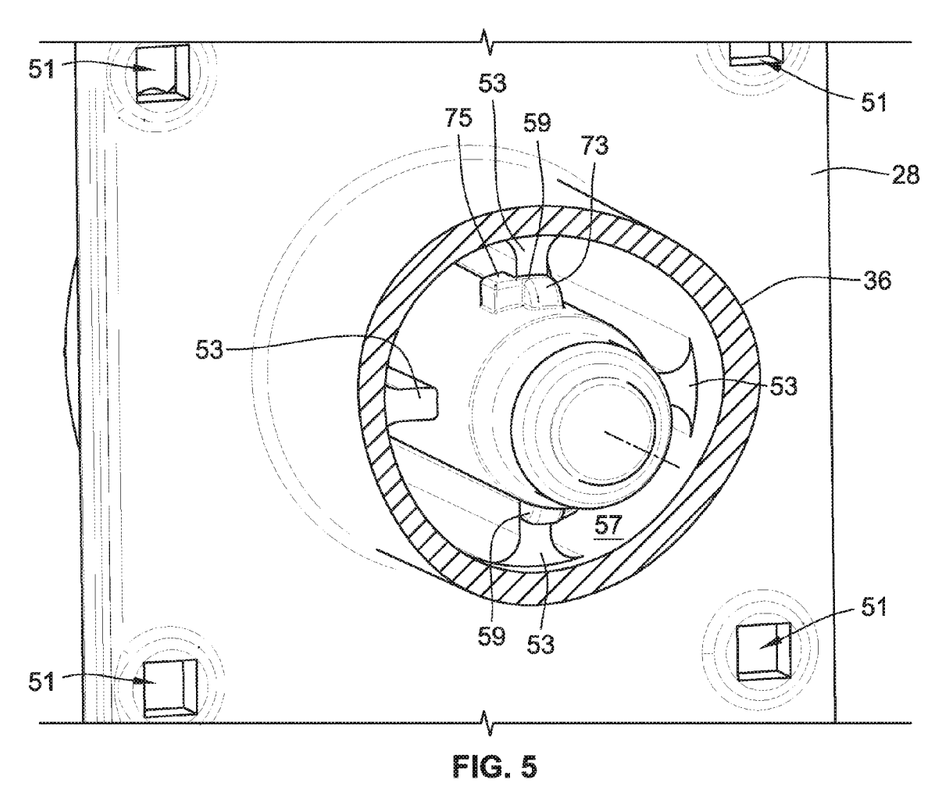
FIG. 5 is a cross section through the central cylinder showing the bayonet type mounting of the primary bus connector on the internal ribs therein.
Figure 6:
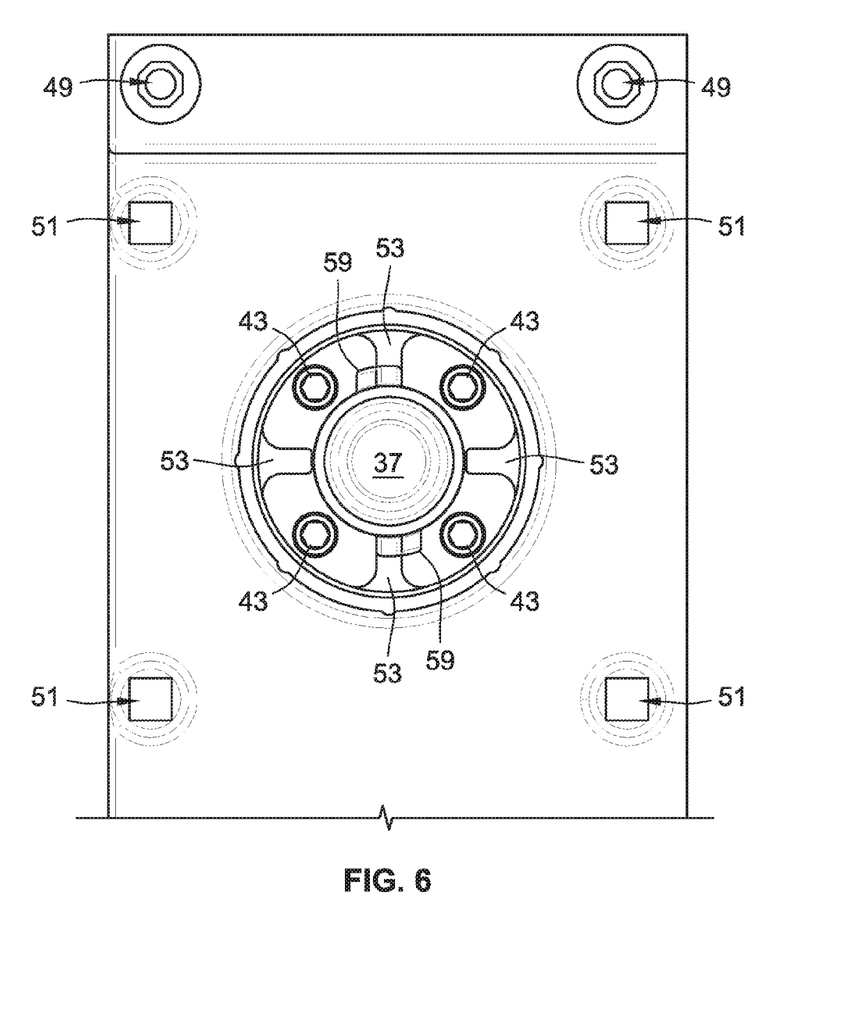
FIG. 6 is a front elevation of the frame assembly, minus its outside mounting flanges, with the primary bus connector therein.
Figure 7:
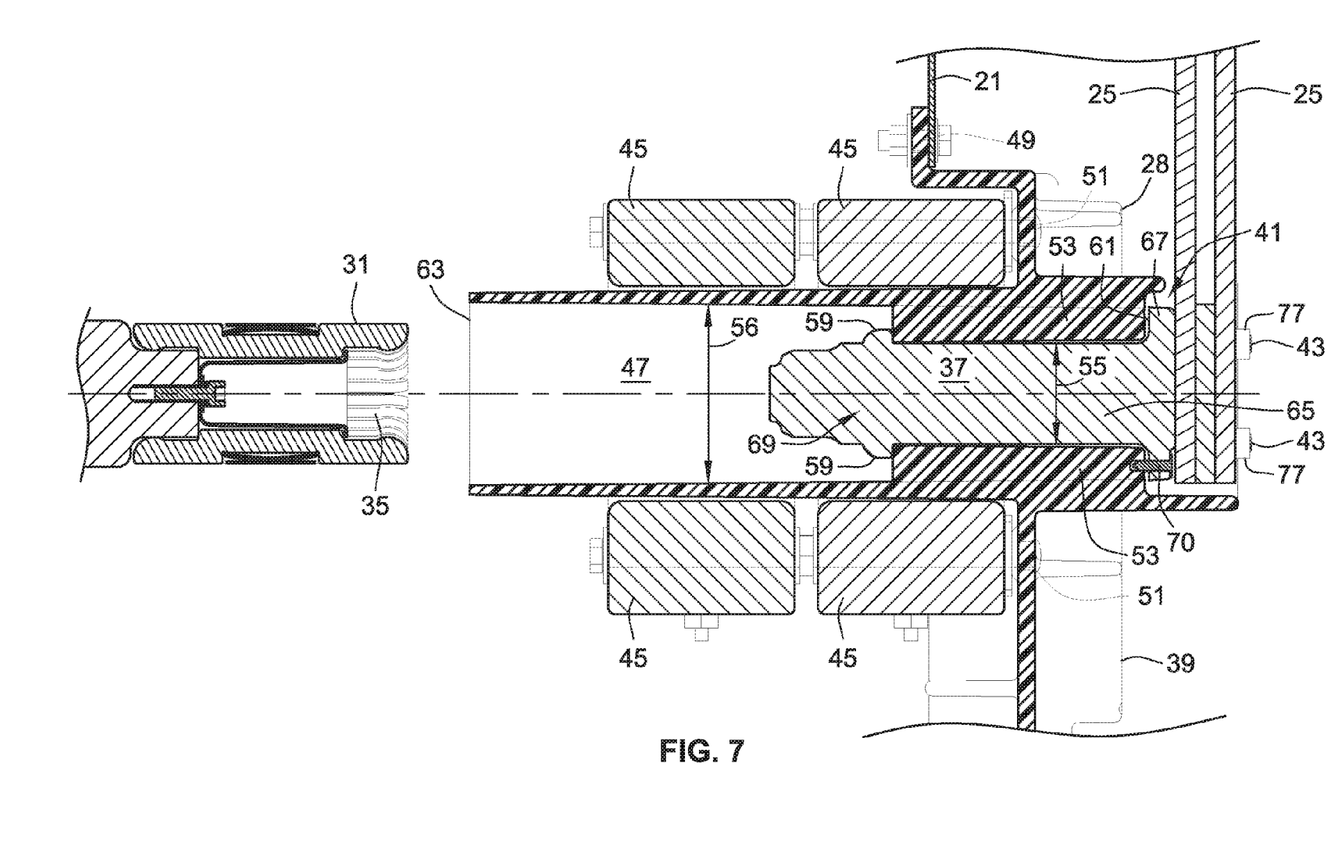
FIG. 7 is a side cross section of the frame assembly with the primary bus connector therein and current transformers mounted on the central cylinder.

Referring also to FIGS. 4-7, the primary bus connector 37 has a conductor rod portion 65 and a base portion 67; wherein the conductor rod portion 65 of the primary bus connector 37 is sized to fit in the lesser bore 55, and the conductor rod portion has locking fins 59 extending radially from the outer wall of a forward section 69 thereof, and the base portion 67 extends perpendicularly therefrom and has throughholes, collectively 71 therein sized for the fastening bolts 43. The locking fins 59 are two members 180 degrees apart, each comprising circumferentially offset forward members 73 and rearward members 75 combined in a roughly "S"-shape and being sized to fit through the fastening chambers 57. The locking fins 59 extend partially beyond the internal ribs 53 when the conductor rod portion 65 is fully inserted into the central cylinder 36 and rotated to place the rearward members 75 against the corresponding internal ribs 53 thereby defining a bayonet type mount with the locking fins 59 abutting ends of the ribs and holding the conductor rod portion 65 in place in the central cylinder 36 and positioning the through holes 71 of the base portion 67 in line with the fastening chambers 57. Upon insertion and mounting the base portion 67 will be at rest in the three sided pocket 41. At this point a bus conductor 25, having a hole pattern matching the hole pattern in the base portion 67, can be placed over the base portion and connected thereto by the use of the fastening bolts 43 through the base portion 67 and the bus conductor 25. As shown in FIG. 4, the base portion 67 has a fifth hole 68 for receiving a plastic place-holder insert 70 (FIG. 7) to maintain orientation of the hole patterns until the bus conductor and base portion are secured together. In the illustrated embodiment the holes of the bus conductor 25 are fitted with threaded inserts 77 to provide for further securement. It will be appreciated that different patterns of holes may be used, including a hole for a central bolt through the entire primary bus connector 37 including the conductor rod portion 65 and base portion 67 if desired.

While particular aspects, implementations, and applications of the present disclosure have been illustrated and described, it is to be understood that the present disclosure is not limited to the precise construction and compositions disclosed herein and that various modifications, changes, and variations may be apparent from the foregoing descriptions without departing from the scope of the disclosed embodiments as defined in the appended claims.

The invention claimed is:

1. In a circuit breaker cabinet having a front and a back, a frame assembly for a front mounted primary bus connector, comprising:

a frame plate fastenable to a back wall of a circuit breaker cabinet;

a central cylinder extending perpendicularly through the frame plate and with internal ribs in the bore of the cylinder, the radial space between the ribs defining a lesser bore for closely accepting a primary bus connector, with circumferential spaces between the ribs defining fastening chambers for admitting threaded fasteners into the bore;

a primary bus connector with a conductor rod portion and a base portion; wherein the conductor rod portion of the primary bus connector is sized to fit in the lesser bore, and the conductor rod portion has locking fins extending radially from a forward section thereof, and the base portion extends perpendicularly therefrom and has throughholes therein sized for the threaded fasteners;

the locking fins being sized to fit through the fastening chambers; and extending partially beyond the ribs when the conductor rod portion is fully inserted into the central cylinder thereby defining a bayonet type mount with the locking fins abutting ends of the ribs and holding the conductor rod portion in place in the central cylinder and positioning the through holes of the base portion in line with the fastening chambers;

whereby a bus conductor, having a pattern of holes matching a pattern of holes in the base portion, can be placed over the base portion and connected thereto by the use of threaded fasteners through the base portion and the bus conductor.

2. The frame assembly according to claim 1 wherein the internal ribs are not as long as the main bore of the cylinder.

3. The frame assembly according to claim 1 wherein the central cylinder is longer than the conductor rod so that a free end of the primary bus connector is surrounded by the central cylinder.

4. The frame assembly of claim 1 further having a fitted pocket to surround the bus bar on three sides.

5. The frame assembly of claim 1 wherein the central cylinder serves as a current transformer bushing with the outside diameter of the central cylinder being sized to accept the central opening of a current transformer.

6. The frame assembly of claim 1 including a backwall flange for fastening the frame plate to the back wall of the circuit breaker cabinet.

* * * * *